(12) United States Patent
Gupta

(10) Patent No.: US 11,941,676 B2
(45) Date of Patent: Mar. 26, 2024

(54) AUTOMATIC ORDERING OF CONSUMABLE ITEMS

(71) Applicant: eBay Inc., San Jose, CA (US)

(72) Inventor: Neeraj Gupta, Milpitas, CA (US)

(73) Assignee: eBay Inc., San Jose, CA (US)

( * ) Notice: Subject to any disclaimer, the term of this patent is extended or adjusted under 35 U.S.C. 154(b) by 88 days.

(21) Appl. No.: 16/716,818

(22) Filed: Dec. 17, 2019

(65) Prior Publication Data
US 2021/0182931 A1    Jun. 17, 2021

(51) Int. Cl.
| | |
|---|---|
| *G06Q 30/0601* | (2023.01) |
| *G06Q 10/087* | (2023.01) |
| *G06Q 50/28* | (2012.01) |
| *G06T 7/00* | (2017.01) |
| *G06T 7/70* | (2017.01) |
| *G06V 20/20* | (2022.01) |
| *H04L 12/28* | (2006.01) |

(52) U.S. Cl.
CPC ....... *G06Q 30/0619* (2013.01); *G06Q 10/087* (2013.01); *G06Q 30/0631* (2013.01); *G06Q 30/0643* (2013.01); *G06Q 50/28* (2013.01); *G06T 7/70* (2017.01); *G06T 7/97* (2017.01); *G06V 20/20* (2022.01); *H04L 12/2825* (2013.01); *G06T 2207/10004* (2013.01); *G06T 2207/30128* (2013.01); *G06T 2207/30242* (2013.01)

(58) Field of Classification Search
CPC ............. G06Q 10/087; G06Q 30/0264; G06Q 30/0631; G06Q 30/0635; G06Q 30/0255
See application file for complete search history.

(56) References Cited

U.S. PATENT DOCUMENTS

| | | | | |
|---|---|---|---|---|
| 9,449,208 B2 * | 9/2016 | Luk | ................... | G06K 7/10415 |
| 9,784,497 B2 * | 10/2017 | Wang | ..................... | F25D 29/00 |
| 10,430,858 B1 * | 10/2019 | Glasgow | ............ | G06Q 30/0601 |

(Continued)

OTHER PUBLICATIONS

Book, A beginner's guide to Computer Vision in Retail, Retrieved from the Internet URL: <https://hackernoon.com/a-beginners-guide-to-computer-vision-in-retail-b5a31cfd5283>, 2018, 10 pages.

(Continued)

*Primary Examiner* — Peter Ludwig
(74) *Attorney, Agent, or Firm* — FIG. 1 Patents

(57) ABSTRACT

A machine is configured to automatically order consumable items for an account. For example, the machine accesses image input associated with a consumable item. The image input is recorded by a camera associated with a client device. The machine identifies an account based on an identifier of the client device. The machine determines a level of consumption of the consumable item for the account based on the image input. The machine, based on the level of consumption, automatically places an order for the consumable item, for the account. The machine, in response to the automatic placing of the order, causes display of a notification describing the automatically placed order in a user interface of the client device. A selection of the notification describing the automatically placed order for the consumable item causes display of an automatically generated request to specify a schedule of future automatic orders for the consumable item.

18 Claims, 8 Drawing Sheets

(56) References Cited

U.S. PATENT DOCUMENTS

| | | | | |
|---|---|---|---|---|
| 10,438,276 | B2* | 10/2019 | Godsey | G06Q 10/087 |
| 10,862,302 | B1* | 12/2020 | Eyford, III | G06Q 10/06315 |
| 10,921,039 | B2* | 2/2021 | Woo | G06Q 30/0601 |
| 10,935,310 | B2* | 3/2021 | Junge | G01G 19/414 |
| 11,016,634 | B2* | 5/2021 | Agboatwalla | G06F 3/04883 |
| 11,030,571 | B2* | 6/2021 | Glasgow | G06Q 10/087 |
| 2009/0228325 | A1* | 9/2009 | Simmons | G06Q 30/0601 |
| | | | | 705/7.23 |
| 2015/0149298 | A1* | 5/2015 | Tapley | G06Q 30/0269 |
| | | | | 705/14.66 |
| 2015/0178654 | A1* | 6/2015 | Glasgow | G06Q 10/06315 |
| | | | | 705/7.25 |
| 2016/0132821 | A1* | 5/2016 | Glasgow | G06Q 10/087 |
| | | | | 705/28 |
| 2018/0144292 | A1* | 5/2018 | Mattingly | G06Q 10/087 |
| 2018/0342329 | A1* | 11/2018 | Rufo | H04L 12/2812 |
| 2019/0001288 | A1* | 1/2019 | Ciepiel | G06K 7/1413 |
| 2019/0149725 | A1* | 5/2019 | Adato | H04N 1/32144 |
| | | | | 348/158 |
| 2019/0390898 | A1* | 12/2019 | Wetzl | F25D 29/005 |
| 2020/0065757 | A1* | 2/2020 | Lee | G06K 9/00671 |
| 2020/0286124 | A1* | 9/2020 | Hiremath | G06N 5/048 |
| 2020/0286157 | A1* | 9/2020 | Ahi | G06Q 30/0261 |
| 2021/0110827 | A1* | 4/2021 | Tran | G10L 15/1822 |
| 2021/0150430 | A1* | 5/2021 | Norwood | G06Q 10/0631 |

OTHER PUBLICATIONS

Palladino, FridgeCam Lets You Make Your Dumb Fridge Smart With A Simple Camera, Retrieved from the Internet URL: <https://arstechnica.com/gadgets/2017/01/fridgecam-lets-you-make-your-dumb-fridge-smart-with-a-simple-camera/>, 2017, 3 pages.

Riva, 4 FMCG Startups Big Brands Need to Watch, Retrieved from the Internet URL: <https://www.onespace.com/blog/2018/04/4-fmcg-startups-big-brands-need-to-watch/>, 2018, 8 pages.

No Author, SmarteFridgeCam, 2019, 2 pages.

Hill, How Target figured out a teen girl was pregnant before her father did, 2012, 6 pages.

* cited by examiner

AUTOMATIC ORDERING OF CONSUMABLE ITEMS

TECHNICAL FIELD

Embodiments of the present disclosure relate generally to automatically ordering consumable items for an account, but not by way of limitation, to generating an enhanced user interface for displaying an automatically placed order for a consumable item and for specification of a schedule of future automatic orders for the consumable item.

BACKGROUND

Consumable items, such as milk, vegetables, cereal, chips, or cans of soda. are consumed at various rates or purchased in various amounts by different people or families. Currently, certain e-commerce operators provide subscription services to user who would like to periodically purchase goods from these e-commerce operators. The subscription services offered by these e-commerce operators allow user to set up recurring orders for various consumable items. For example, a user may purchase, via a subscription, vitamins every three months, or milk every week.

Unfortunately, such subscription services require a lot of interaction by the user with the e-commerce operator's platform when the user would like to modify or cancel orders or subscriptions. For example, when the user is on vacation or does not consume a product, the user has to log into the e-commerce operator's system and cancel the order or change the subscription for the product. These required interactions by the user with the e-commerce operator's system are time consuming for the user. In addition, these user interactions increase the demand for data storage and diminish data processing speeds of the e-commerce operator's system.

BRIEF DESCRIPTION OF THE DRAWINGS

Various ones of the appended drawings merely illustrate example embodiments of the present disclosure and cannot be considered as limiting its scope.

Figure 1:
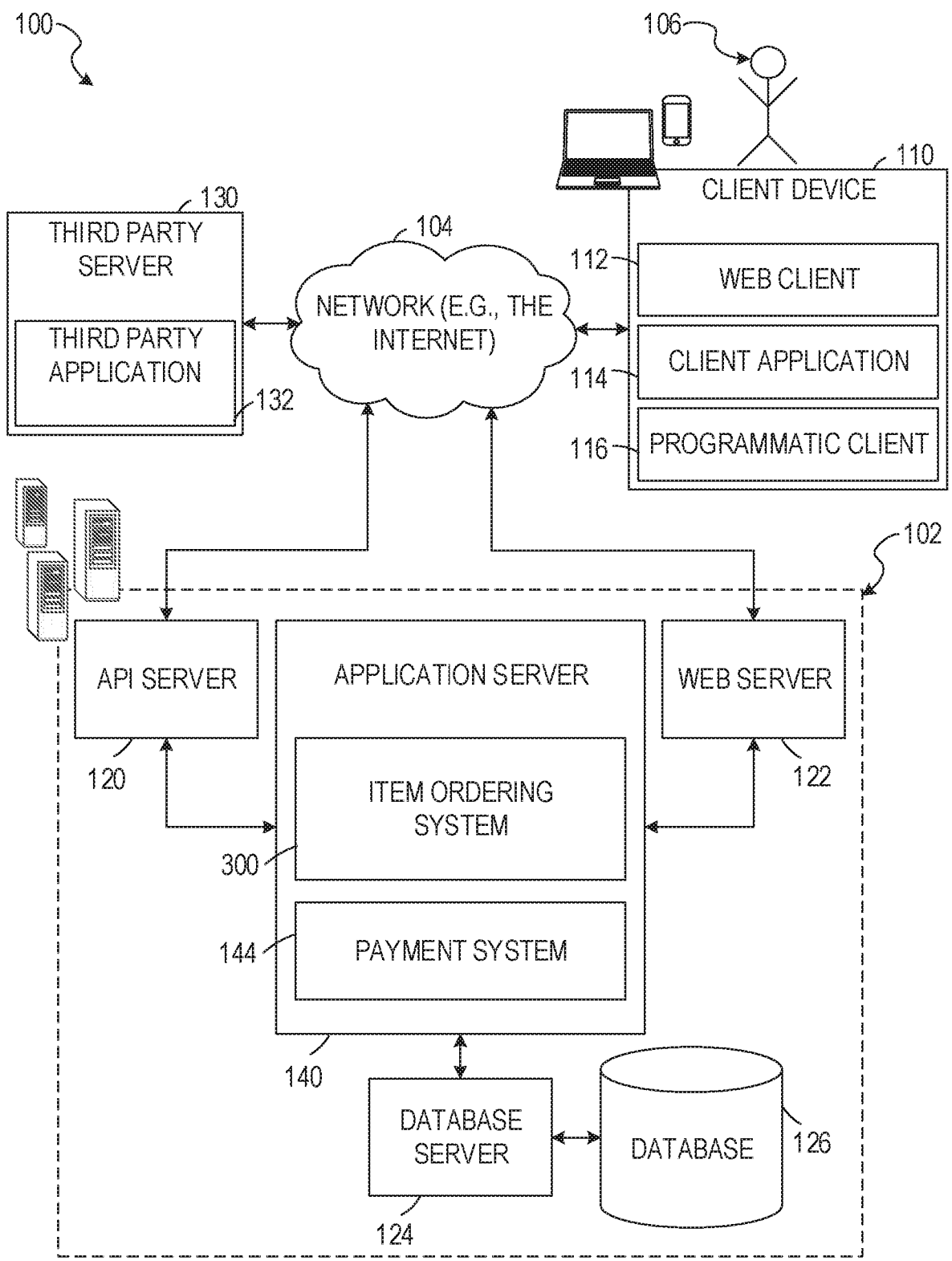
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

According to some example embodiments, an item ordering system that automatically identifies a level of consumption of a consumable item, for an account, and, based on the level of consumption, automatically orders the consumable items for the account provides a technical solution to the technical problems of increased demand for data storage and diminished data processing speeds faced by the e-commerce systems that currently provide subscription services for consumable items. The item ordering system accesses (e.g., receives or obtains) image input associated with a consumable item. The image input may be accessed from a client device associated with a user or an account that represents the user. In some example embodiments, the client device is a computer associated with the user or the account. In various example embodiments, the client device is a smart appliance (e.g., a refrigerator) associated with the user or the account.

A consumable item may be a commodity that is intended to be used relatively quickly, such as milk, soda, bread, cereal, or vegetables. The image input may include at least one of a video or a photograph. The image input may be recorded by a camera associated with the client device. For example, a camera installed in the kitchen of a user (e.g., in the refrigerator or in a pantry) captures photographic images or records video of the inside of a food storage location (e.g., a refrigerator, a pantry, or a kitchen cabinet) at various times or continuously. The camera may transmit, via a client device, the captured image input to the item ordering system. In some instances, the camera is included in (e.g., is part of) the client device.

The item ordering system identifies an account based on an identifier of the client device, and determines a level of consumption of the consumable item for the account based on the image input. The item ordering system may utilize image analysis and image recognition techniques to determine the level of consumption of the consumable item.

Based on the level of consumption of the consumable item, the item ordering system automatically places an order for the consumable item, for the account. In some example embodiments, the user associated with the account, when setting up the account, provides permission to the item ordering system to place automatic orders for consumable items, for the account, based on a determination, by the item ordering system, that the consumable item should be reordered. In some example embodiments, the item ordering system 300 allows the user to preview the order before the order for the consumable item is placed. The preview can be in the form of a Short Message Service (SMS) message, email message, or some other type of notification. Once the user approves the order, the item ordering system 300 places the order. The item ordering system 300 may also give the user a selectable option, in the user interface, to request that the item ordering system 300 stop asking the user to preview future orders and instead proceed with automatic ordering of consumable items.

The item ordering system, in response to the automatic placing of the order for the consumable item, causes display of a notification describing the automatically placed order for the consumable item in a user interface of the client device associated with the account. A selection, by the user associated with the account, of the notification describing the automatically placed order for the consumable item enhances (e.g., improves or updates) the user interface to display an automatically generated request to specify a schedule of future automatic orders for the consumable item. The schedule of future automatic orders may be automatically generated by the item ordering system based on a pattern of consumption of the consumable item by the users associated with the account (e.g., the user or the family represented by the account), and may be displayed in the enhanced user interface. The item ordering system may determine the pattern of consumption of the consumable items based on analysis of image input associated with the consumable item over a period of time, and may predict future consumption of the consumable item for the account using machine learning techniques.

In some example embodiments, after the item ordering system places automatic orders for a plurality of consumable items located in a plurality of locations (e.g., a first consumable item is stored in the refrigerator and a second consumable item is stored in the kitchen pantry), the item ordering system displays the orders for the plurality of consumable items merged on a single page presented in the notification. In certain example embodiments, after the item ordering system places automatic orders for a plurality of consumable items located in a plurality of locations, the item ordering system displays the orders for the plurality of consumable items in a paginated form on multiple pages presented in the notification. In some example embodiments, the item ordering system provides metrics of user consumption of the consumable items to sellers of the consumable items. For example, the metrics of the level of consumption of milk in a geographic area over a period of time may be presented in a report or a dashboard displayed in a client device associated with a seller of milk. The report or dashboard may help sellers manage their inventories of consumable items, project sales of the consumable items, and make accurate orders from wholesalers.

In some example embodiments, the item ordering system, based on determined levels of consumption of a consumable item by users in a certain geographic area and based on consumer item purchase data associated with a seller, predicts a number of consumable items that may be purchased from the seller within a period of time. The item ordering system may cause the display, via a user interface of a client device associated with the seller, of a dashboard that illustrates a pattern of use or a pattern of purchase of the consumable item over a period of time by one or more users. For example, the dashboard may indicate that buyers tend to buy more milk on the weekend. Based on knowledge of patterns of purchase or patterns of use, a seller may provide incentives to buyers to persuade the buyers to purchase milk from the seller.

According to another example, the dashboard includes a communication to the seller, such as "Our system predicts that X gallons of milk may be purchased from you in the next fifteen days." The item ordering system may also generate and display, in the dashboard, a graph of past or predicted cumulative user consumption of the consumable item, or a graph of potential orders over a particular period of time for the seller or for the market in the geographic area (e.g., all sellers of the consumable item in San Jose, CA). For example, one or more graphs displayed in the dashboard indicate that fifty gallons of milk were purchased from a first seller, and that the market in the geographic area is five hundred gallons.

Conventional user interfaces have many deficits relating to the efficient functioning of the computer, requiring a user of a conventional user interface to scroll around and switch views many times to find the right data associated with an item, especially when the conventional user interface is displayed on a small screen. Because small screens tend to need data and functionality divided into many layers or views, conventional user interfaces require users to drill down through many layers to get to desired data or functionality. That process can seem slow, complex, and difficult to learn, particularly to novice users. Further, that process decreases data processing speeds, and is often associated with higher data storage requirements.

In some example embodiments, an item ordering system that provides a notification describing the automatically placed order for the consumable item in the user interface of the client device associated with the account improves conventional user interfaces by identifying and presenting missing consumable items in the user interface, and presenting an option to specify or modify a schedule of future automatic orders for the consumable item according to a recommendation generated based on an automatically determined pattern of consumption of the consumable item by the user associated with the account. The providing of the notification describing the automatically placed order for the consumable item also enhances the efficiency of electronic devices by improving data processing speeds and data storage efficiency.

With reference to FIG. 1, an example embodiment of a high-level client-server-based network architecture 100 is shown. A networked system 102 provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Washington State), a client application 114, and a programmatic client 116 executing on a client device 110.

The client device 110 may comprise, but is not limited to, mobile phones, desktop computers, laptops, portable digital assistants (PDAs), smart phones, tablets, ultra books, netbooks, multi-processor systems, microprocessor-based or programmable consumer electronics, game consoles, set-top boxes, wearable devices, smart watches, or any other communication devices that a user may utilize to access the networked system 102. In some embodiments, the client device 110 may comprise a display module to display information (e.g., in the form of user interfaces). In further embodiments, the client device 110 comprises one or more of a touch screens, accelerometers, gyroscopes, cameras, microphones, global positioning system (GPS) devices, and so forth. The client device 110 is a device of a user that can be used to capture image input pertaining to consumable items that are within a storage area. In some example embodiments, the networked system 102 comprises a network-based marketplace (also referred to as "online marketplace") that responds to requests for product listings, publishes publications comprising item listings of products or services available on the network-based marketplace, and manages payments for these marketplace transactions. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 includes one or more applications (also referred to as "apps") such as, but not limited to, a web browser, messaging application, electronic mail (email) application, an e-commerce site application (also referred to as a marketplace application), and the like. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., to access to a database of items available for sale, to authenticate a user, to verify a method of payment, etc.). Conversely, if the e-commerce site application is not included in the client device 110, the client device 110 uses its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 may host an item ordering system 300 and a payment system 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or databases 126. In an example embodiment, the databases 126 are storage devices that store information (e.g., publications, listings, digital content items, product descriptions, images of products, etc.) to be utilized by the item ordering system 300. The databases 126 may also store digital item information, in accordance with example embodiments.

Additionally, a third party application 132, executing on one or more third party servers 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The item ordering system 300 provides a number of publication functions and services to users 106 that access the networked system 102. For example, the item ordering system 300 facilitates the automatic ordering of consumable items for an account, and generating an enhanced user interface for displaying automatically placed orders for consumable items and for specification of schedules of future automatic orders for the consumable item. The payment system 144 provides a number of functions to perform or facilitate payments and transactions. While the item ordering system 300 and payment system 144 are shown in FIG. 1 to both form part of the networked system 102, it will be appreciated that, in alternative embodiments, each of the item ordering system 300 and payment system 144 may form part of a service that is separate and distinct from the networked system 102. In some embodiments, the payment system 144 may form part of the item ordering system 300.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The item ordering system 300 and payment system 144 could also be implemented as stand-alone software programs, which do not necessarily have networking capabilities.

The web client 112 accesses the item ordering system 300 or the payment system 144 via the web interface supported by the web server 122. Similarly, the programmatic client 116 accesses the various services and functions provided by the item ordering system 300 or the payment system 144 via the programmatic interface provided by the API server 120. The programmatic client 116 may, for example, be a seller application (e.g., the Turbo Lister application developed by eBay® Inc., of San Jose, California) to enable sellers to author and manage listings on the networked system 102 in an off-line manner, and to perform batch-mode communications between the programmatic client 116 and the networked system 102.

Figure 2:
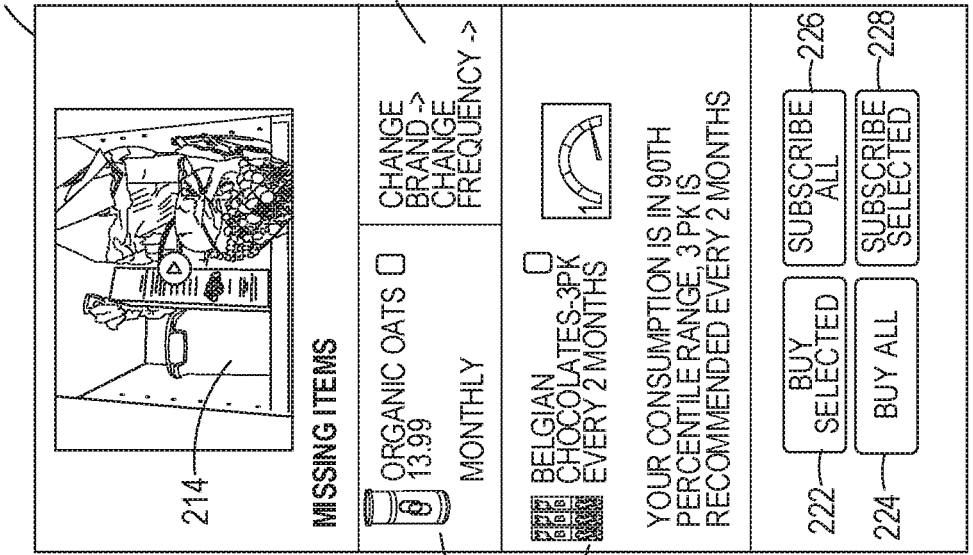
FIG. 2 illustrates user interfaces for displaying automatically placed orders for consumable items, according to some example embodiments.
Figure 2:
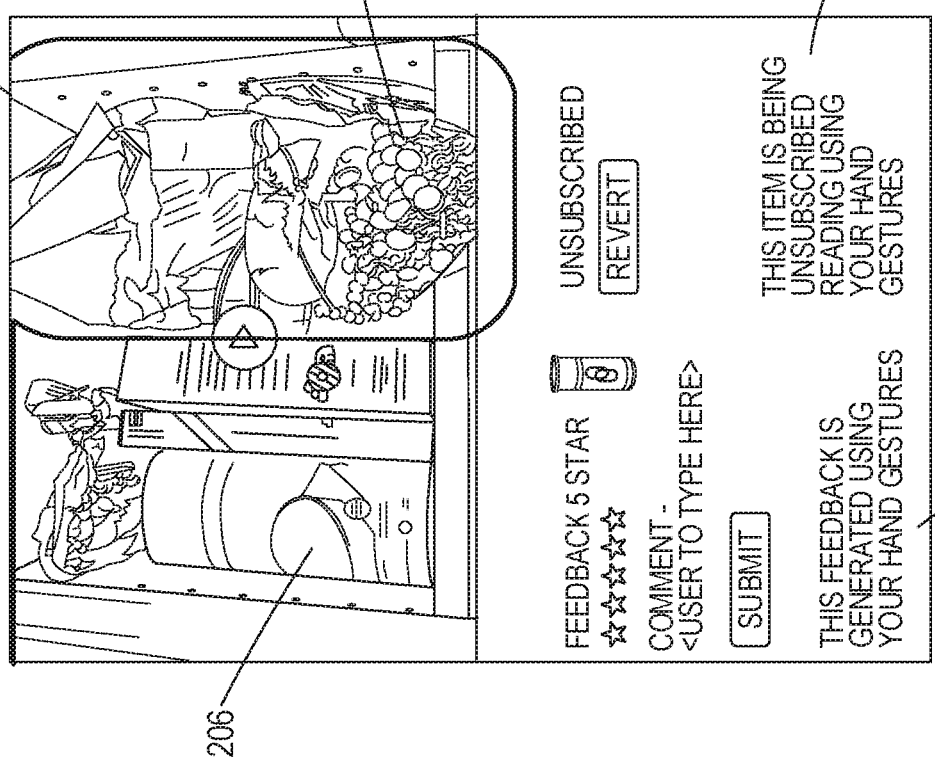

FIG. 2 illustrates user interfaces for displaying automatically placed orders for consumable items, according to some example embodiments. As shown in FIG. 2, user interface 202 displays an image input that shows a plurality of consumable items including consumable item 206 (e.g., a container of organic oats). In some example embodiments, the item ordering system 300 allows the user to provide feedback pertaining to the consumable items that are shown in the image input. For example, the user may type in comments pertaining to consumable item 206, as shown in user interface area 208 of the user interface 202. According to another example, the user may use his or her phone to capture the image input pertaining to the consumable item 206 while making a hand gesture of approval (e.g., a thumbs-up gesture) in association with the consumable item 206 to indicate a five-star review (or feedback) for the consumable item 206, as shown in user interface area 208 of the user interface 202.

The item ordering system 300 also allows the user to unsubscribe from a subscription for a consumable item using gestures. For example, the user may use his or her phone to capture the image input pertaining to a consumable item 210 while making another hand gesture of (e.g., a thumbs-down gesture) in association with the consumable item 210 to indicate a request to unsubscribe from automatic ordering of the consumable item 210, as shown in user interface area 212 of the user interface 202. In some example embodiments, if the image captures more than one consumable item, the user can indicate (e.g., on the touchscreen of his or her phone) the item they want to rate or for which they want to end a subscription.

FIG. 2 also shows user interface 204 that illustrates image input that shows that consumable item 206 has been detected, by the item ordering system 300, to be missing from the location associated with the consumable item 206, as shown in area 214 of the user interface 204. The item ordering system 300 automatically places an order for the consumable item 206, for the account, based on the determining that the consumable item is absent for a certain period of time (e.g., one hour or one day) from the location automatically determined to be a usual location of the consumable item, and provides a notification pertaining to the automatic placing of the order for the consumable item 206, as shown in area 216 of the user interface 204.

As shown in area 218 of the user interface 204, the item ordering system 300 allows the user to specify a schedule of future automatic orders for the consumable item 206 by selecting the box user interface element associated with the suggested schedule of automatic ordering (e.g., monthly). Alternatively, the user may change the frequency of the future automatic orders of the consumable item 206 by clicking on the suggested schedule. In some instances, the user interface 204 allows the user to make other changes to the future automatic orders, such as specifying a different brand of the consumable item 206.

Further, the user interface 204 illustrates options associated with specifying future automatic orders for a different consumable item 220 (e.g., Belgian chocolate). The item ordering system 300 allows the user to specify a schedule of future automatic orders for the consumable item 220 by selecting a box user interface element associated with the suggested schedule of automatic ordering (e.g., every two months). Alternatively, the user may change the frequency of the future automatic orders of the consumable item 220 by clicking on the suggested schedule. In some instances, the user interface 204 displays an indicator of how the consumption of a particular consumable item, by the users associated with the account, compares to the consumption of the particular consumable item, by the users associated with other accounts (e.g., "your consumption is in the $90^{th}$ percentile range"), and a recommendation of the frequency of automatically ordering the consumable item (e.g., "a three-pack is recommended every two months").

In some example embodiments, the user interface 204 provides one or more additional user interface elements 222, 224, 226, or 228 that enhance the functionality of the user interface 204 by allowing the user to buy selected consumable items by clicking on user interface element 222, to buy all the consumable items that are listed in the user interface 204 by clicking on user interface element 224, to subscribe to selected consumable items that are listed in the user interface 204 by clicking on user interface element 226, or to subscribe to all consumable items that are listed in the user interface 204 by clicking on user interface element 228.

Figure 3:
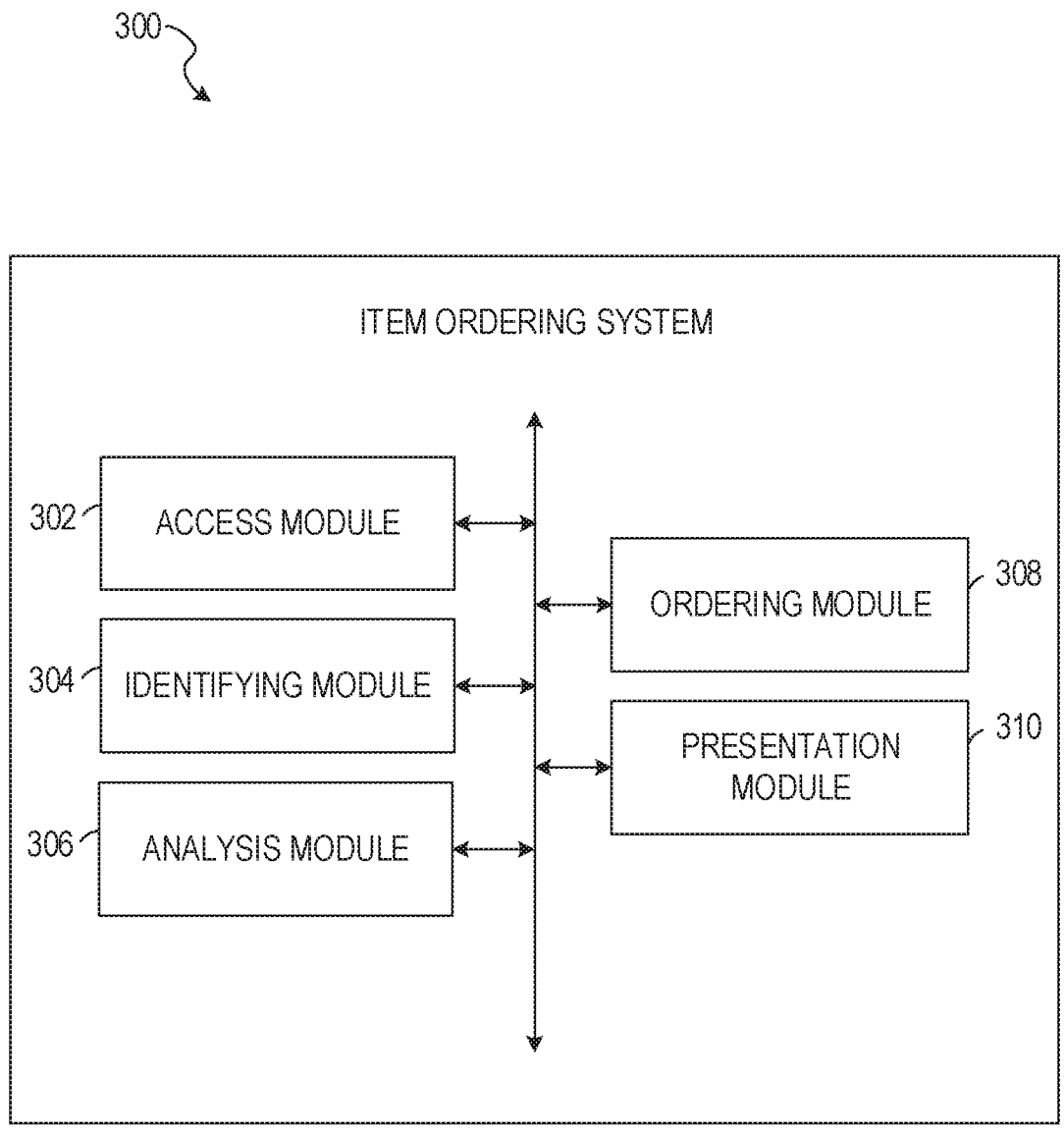
FIG. 3 is a block diagram illustrating components of an item ordering system, according to some example embodiments.

FIG. 3 is a block diagram illustrating components of the item ordering system 300, according to some example embodiments. As shown in FIG. 3, the item ordering system 300 includes an access module 302, an identifying module 304, an analysis module 306, an ordering module 308, and a presentation module 310, all configured to communicate with each other (e.g., via a bus, shared memory, or a switch).

According to some example embodiments, the access module 302 accesses (e.g., receives, obtains, or is provided) image input associated with a consumable item. The image input may be accessed from a record of a database. The image input may be provided to the item ordering system 300 by a client device. The image input may be recorded by a camera associated with the client device, and may include at least one of a video or a photograph. The image input may depict one or more consumable items. The one or more consumable items, in some instances, are stored in a refrigerator or a pantry of the user. For example, a refrigerator of the user is associated with (e.g., includes) a camera that records images (e.g., photographs or video) of the one or more consumable items over a period of time. A series of images taken at different times of the period of time may indicate that some or all of the consumable items that appear in the images are partially or fully consumed (or depleted). In some instances, the one or more consumable items are stored in a refrigerator or a pantry of a store (e.g., a grocery store).

The identifying module 304 identifies an account based on an identifier (e.g., a phone number, a Unique Device Identifier (UDID), a mobile equipment identifier (MEID), Internet Protocol (IP) address, a media access control (MAC) address, etc.) of the client device.

An analysis module 306 determines a level of consumption of the consumable item for the account based on the image input. In some example embodiments, the determining of the level of consumption of the consumable item for the account based on the image input includes identifying a first image input associated with a first timestamp, identifying a second image input associated with a second timestamp that is subsequent to the first timestamp, and determining, based on comparing the first image input and the second image input, a change in the second image input. In some example embodiments, the change in the second image input indicates a decrease in the consumable item. In various example embodiments, the change in the second image input indicates a change in the appearance of the consumable item (e.g., a vegetable changes its shape, color, or texture as it becomes spoilt). In various example embodiments, the change in the second image indicates that the consumable item is being replaced (e.g., a new, empty garbage bag replaces an old, full garbage bag).

An ordering module 308, based on the level of consumption of the consumable item, automatically places an order for the consumable item, for the account. In some example embodiments, the automatic placing of the order for the consumable item includes, using payment data previously provided by the user associated with the account, generating an order for the consumable item on behalf of the user from an e-commerce platform.

A presentation module 310, in response to the automatic placing of the order for the consumable item, causes display of a notification describing the automatically placed order for the consumable item in a user interface of the client device associated with the account. A selection, by the user, of the notification describing the automatically placed order for the consumable item via the user interface of the client device causes display of an automatically generated request to specify a schedule of future automatic orders for the consumable item.

To perform one or more of its functionalities, the item ordering system 300 communicates with one or more other systems. For example, an integration engine (not shown) may integrate the item ordering system 300 with one or more email server(s), web server(s), one or more databases, or other servers, systems, or repositories.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources to allow information to be passed between the applications and to allow the applications to share and access common data. Furthermore, the modules may access database 126.

Figure 4:
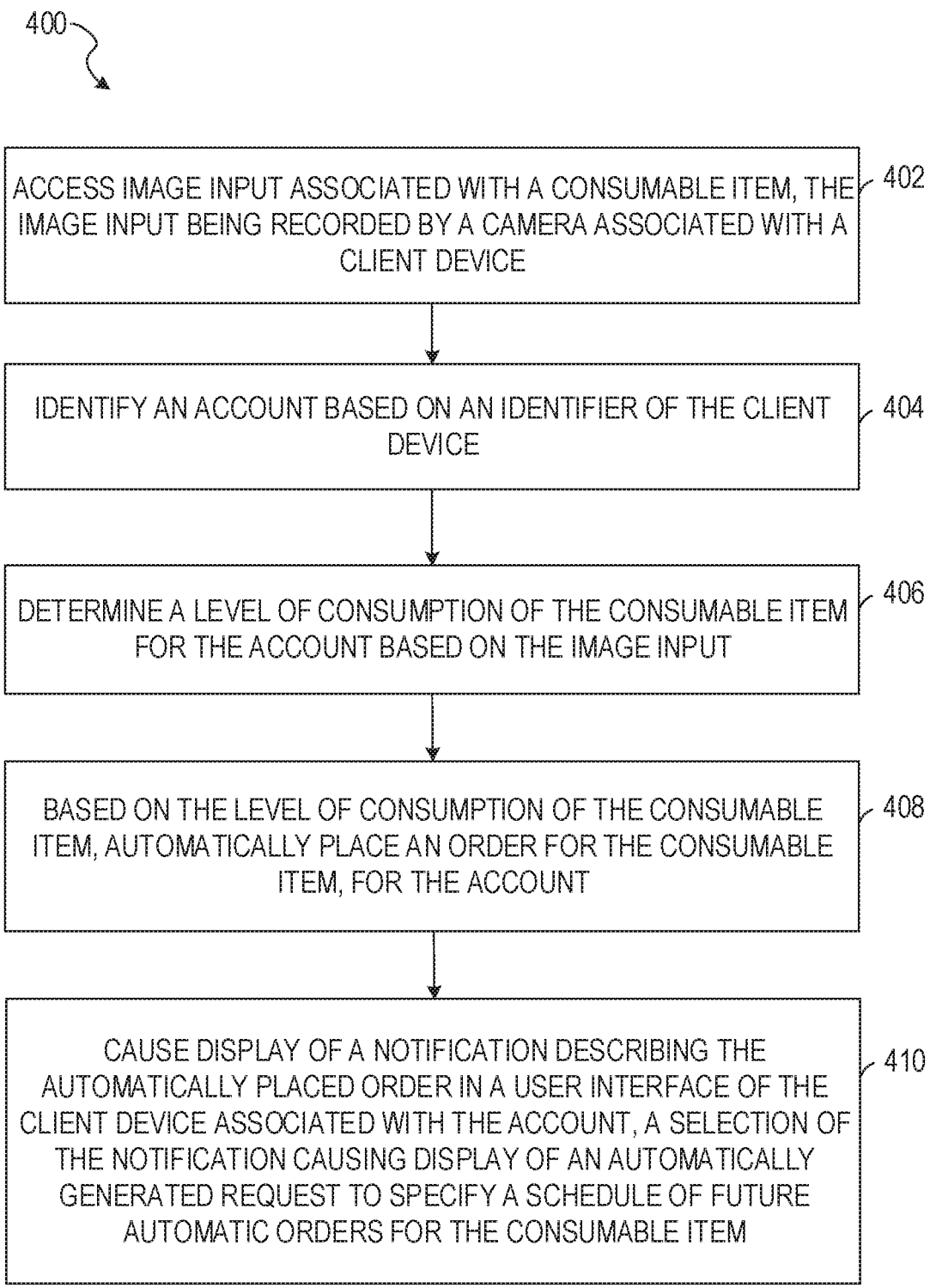
FIG. 4 is a flow diagram illustrating a method for automatically placing an order for a consumable item, according to some example embodiments.
Figure 5:
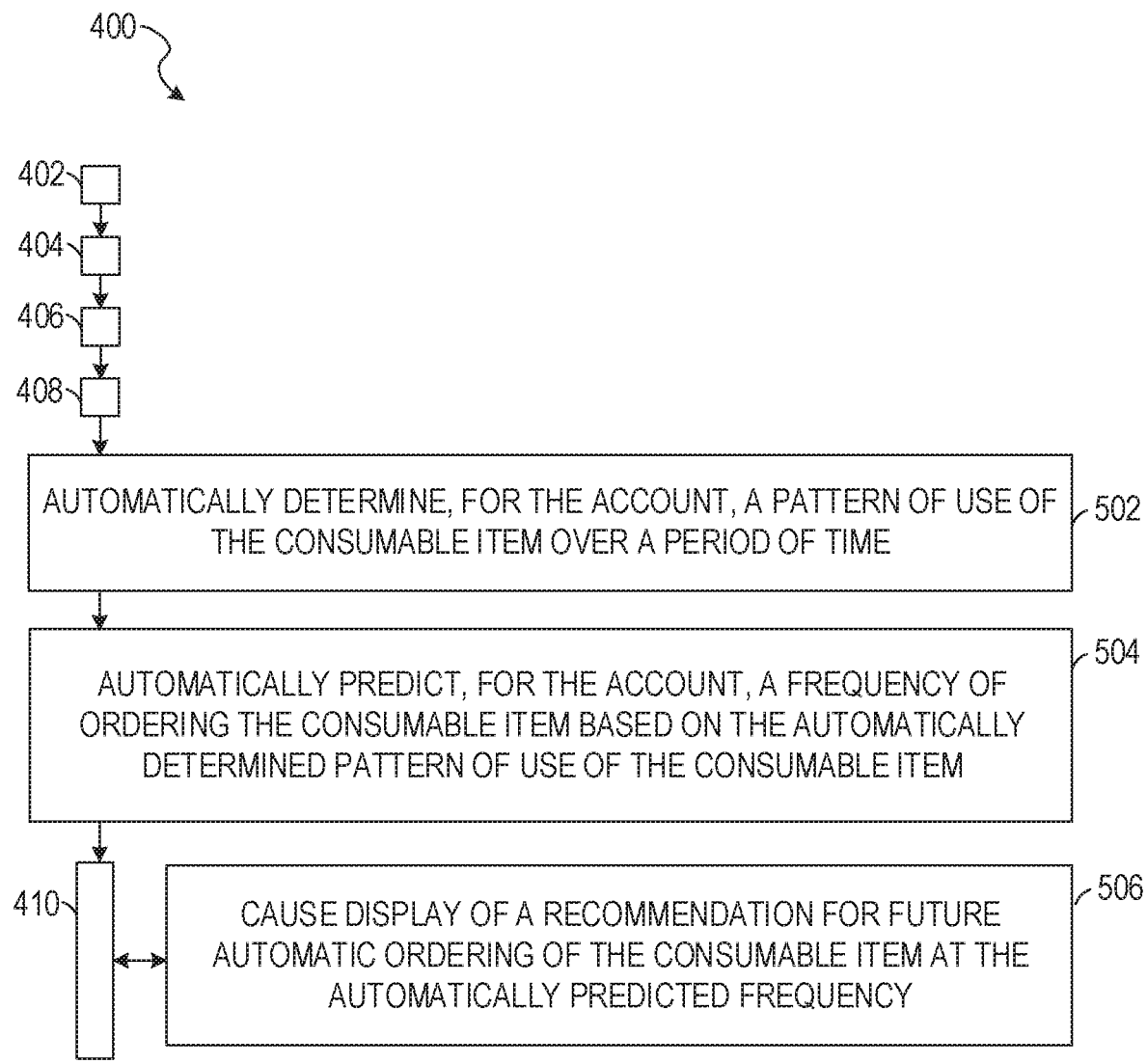
FIG. 5 is a flow diagram illustrating a method for automatically placing an order for a consumable item representing additional steps of the method illustrated in FIG. 4, and representing step 410 of the method illustrated in FIG. 4 in more detail, according to some example embodiments.
Figure 6:
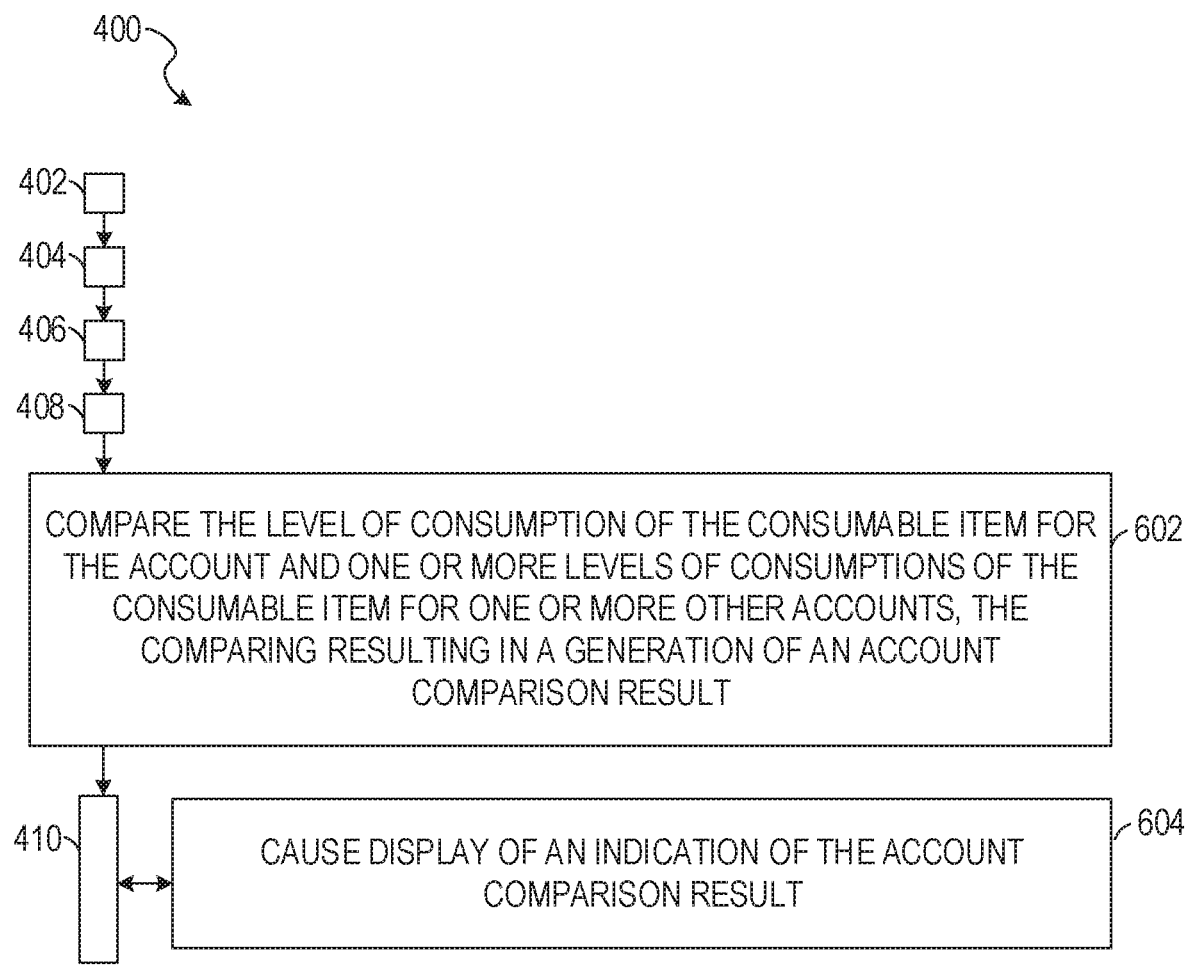
FIG. 6 is a flow diagram illustrating a method for automatically placing an order for a consumable item, representing an additional step of the method illustrated in FIG. 4, and representing step 410 of the method illustrated in FIG. 4 in more detail, according to some example embodiments.

FIGS. 4-6 are flowcharts illustrating a method for automatically placing an order for a consumable item, according to some example embodiments. Operations in method 400 illustrated in FIG. 4 may be performed using modules described above with respect to FIG. 3. As shown in FIG. 4, method 400 may include one or more of method operations 402, 404, 406, 408, and 410, according to example embodiments.

At operation 402, the access module 302 accesses image input associated with a consumable item. The image input is recorded by a camera associated with a client device. The image input includes at least one of a video or a photograph of one or more consumable items within a storage area.

At operation 404, the identifying module 304 identifies an account based on an identifier of the client device. The identifying may be performed based on matching the identifier of the client device, received from the client device, to an identifier included in the data associated with the account in a database record.

At operation 406, the analysis module 306 determines a level of consumption of the consumable item for the account based on the image input.

In some example embodiments, the determining of the level of consumption of the consumable item for the account based on the image input includes: identifying a first image input associated with a first timestamp; identifying a second image input associated with a second timestamp that is subsequent to the first timestamp; and determining, based on comparing the first image input and the second image input, a change in the second image input that indicates a decrease in the consumable item. For example, the first image input taken on Monday at 9 a.m. shows that a third of a bottle of milk stored in the refrigerator has been consumed. The second image input taken on Tuesday at 9 a.m. shows that two thirds of the bottle of milk stored in the refrigerator has been consumed. Based on comparing the first image input and the second image input, the analysis module 306 determines the level of consumption of the consumable item for the account to be a third of a bottle of milk per day (or, specifically, between 9 a.m. on Monday and 9 a.m. on Tuesday).

In some example embodiments, the account includes transaction data associated with the consumable item, and the determining of the level of consumption of the consumable item is further based on the transaction data (e.g., records of previous purchases associated with the account). For example, the analysis module 306, using records of previous purchases of the consumable item over a period of time (e.g., a month, six months, or a year), may determine a level of consumption of the consumable item over the period of time. The analysis module 306 may also determine whether a recent level of consumption (e.g., in the last month) of the consumable item has increased or decreased in comparison with the level of consumption of the consumable item during a different period of time (e.g., December 2019 vs. December 2018).

At operation 408, the ordering module 308 automatically places an order for the consumable item, for the account. The automatic placing of the order for the consumable item, for the account is based on the level of consumption of the consumable item determined in operation 406.

In some example embodiments, the automatic placing of the order for the consumable item, for the account, is further based on determining that the level of consumption of the consumable item is equal to or exceeds a threshold value. For example, the threshold value is three quarters of a gallon of milk. Based on a determination, by the analysis module 306, that the level of consumption of milk, for the account, has exceeded three quarters of the gallon of milk, the ordering module 308 automatically places an order for milk, for the account. According to another example, the threshold value is four cans in a six-pack of cans (e.g., cans of soda). Based on a determination, by the analysis module 306, that the level of consumption of soda, for the account, is equal to four cans, the ordering module 308 automatically places an order for soda, for the account. In some example embodiments, the amount of automatically ordered consumable item is based on a determined pattern of consumption of the consumable item for the account.

In various example embodiments, the automatic placing of the order for the consumable item, for the account, is further based on determining that the consumable item is absent from a location automatically determined to be a usual location of the consumable item.

At operation 410, the presentation module 310 causes display of a notification describing the automatically placed order for the consumable item in a user interface of the client device associated with the account. The causing display is performed in response to the automatic placing of the order for the consumable item. A selection of the notification describing the automatically placed order for the consumable item may cause display of an automatically generated request to specify a schedule of future automatic orders for the consumable item. The selection may be made by the user via the user interface of the client device.

Further details with respect to the method operations of method 400 are described below with respect to FIGS. 5 and 6.

As shown in FIG. 5, method 400 includes one or more of operations 502, 504, and 506, according to some embodiments. Operation 502 may be performed after operation 408, in which the ordering module 308 automatically places an order for the consumable item, for the account.

At operation 502, the analysis module 306 automatically determines, for the account, a pattern of use of the consumable item over a period of time. The automatic determining of the pattern of use is based on automatic detecting of a change associated with the consumable item in a plurality of image inputs associated with a plurality of timestamps. The plurality of timestamps are automatically associated with the plurality of image inputs at a plurality of times of generating the plurality of image inputs.

For example, a first image input (e.g., a first image or photograph) of a bottle of milk in the refrigerator is captured, by a camera, at a first time (e.g., in the morning of a particular day). A second image input (e.g., a second image or photograph) of the bottle of milk in the refrigerator is captured, by a camera, at a second time (e.g., in the evening of the particular day). The first image input and the second image input are transmitted to the item ordering system 300. The analysis module 306 of the item ordering system 300 compares the first image input and the second image input, and automatically detects a change associated with the bottle of milk in the second image input based on the comparison to the first image input. The system 300 may utilize image analysis and image recognition techniques to detect changes associated with a plurality of image inputs.

In some example embodiments, the change associated with the bottle of milk may include a decrease in the volume of milk. In various example embodiments, the change associated with the bottle of milk may include an absence of the bottle of milk in a location of the refrigerator where the bottle of milk is usually located. The absence of the bottle of milk from its usual location in the refrigerator may indicate that the milk was fully consumed. In some instances, to increase the confidence that the milk was fully consumed and to not place an order for milk prematurely, the system 300 utilizes additional image inputs (e.g., image inputs of the bottle of milk's usual location captured at later times, image inputs of additional areas of the refrigerator, or image inputs of one or more areas of a house, such as a kitchen table or a kitchen counter) to make a determination that the absence of the bottle of milk from its usual location in the refrigerator indicates the milk was fully consumed.

In some example embodiments, the analysis module 306 determines, based on analyzing image inputs associated with a first timestamp (t1), a second timestamp (t2), a third timestamp (t3), and a fourth timestamp (t4), that there was more consumption of the consumable item between t1 and t2, and less consumption of the consumable item between t2 and t3. For example, the analysis module 306 compares the image inputs of the bottle of milk that are captured at t1, t2, t3, and t4, and can determine that there is more consumption of milk between t1 and t2, and less consumption of milk between t2 and t3. The analysis module 306 predicts, using machine learning algorithms that perform pattern analysis, when the user will run out of milk, and the item ordering system 300 may communicate this information to the user.

At operation 504, the analysis module 306 automatically predicts, for the account, a frequency of ordering the consumable item based on the automatically determined pattern of use of the consumable item. In some example embodiments, the automatic predicting, for the account, of the frequency of ordering the consumable item is further based on one or more calendar events (e.g., an upcoming birthday or Christmas) included in a calendar associated with the account. The predicting of the frequency of ordering of the consumable item may be performed using machine learning algorithms that perform pattern analysis of data associated with the account including image inputs associated with the consumable item, shopping history, subscription data, calendar data, etc.

Operation 506 may be performed as part (e.g., a precursor task, a subroutine, or a portion) of operation 410, in which the presentation module 310 causes display of a notification describing the automatically placed order for the consumable item in a user interface of the client device associated with the account. At operation 506, the causing display of the automatically generated request to specify the schedule of future automatic orders for the consumable item includes causing display of a recommendation for future automatic ordering of the consumable item at the automatically predicted frequency. For example, the recommendation includes options such as "order one gallon of milk, as previously ordered," or "order two gallons of milk based on you increased consumption of milk."

As shown in FIG. 6, method 400 includes one or more of operations 602 and 604, according to some embodiments. Operation 602 may be performed after operation 408, in which the ordering module 308 automatically places an order for the consumable item, for the account.

At operation 602, the analysis module 306 compares the level of consumption of the consumable item, over a period of time, for the account and one or more levels of consumption of the consumable item, over the period of time, for one or more other accounts. For example, the analysis module 306 compares the level of consumption of milk, during November 2019, for the user or users associated with the account and one or more levels of consumption of milk, during November 2019, for the user or users associated with one or more other accounts. The comparing of the level of consumption of the consumable item for the account and the one or more levels of consumption of the consumable item for the one or more other accounts results in generation of an account comparison result.

Operation 604 may be performed as part (e.g., a precursor task, a subroutine, or a portion) of operation 410, in which the presentation module 310 causes display of a notification describing the automatically placed order for the consumable item in a user interface of the client device associated with the account. At operation 604, the causing display of the notification describing the automatically placed order for the consumable item in the user interface includes causing display of an indication of the account comparison result. For example, the indication of the account comparison result may include metrics that show how the consumption of the consumable item by the user associated with the account compares to the consumption of the consumable item by one or more other accounts (e.g., one or more other anonymous families).

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 7:
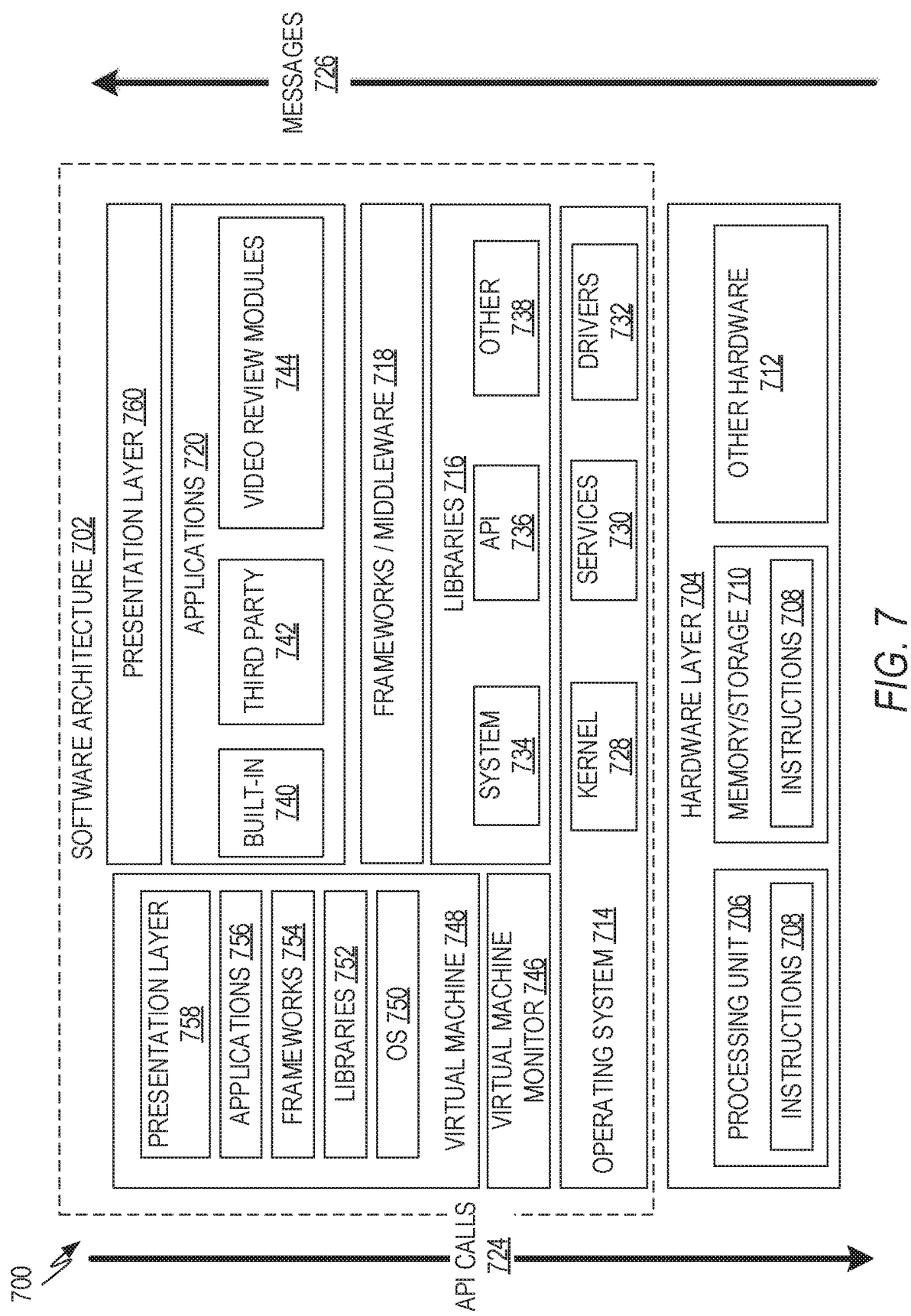
FIG. 7 is a block diagram illustrating an example of a software architecture that may be installed on a machine, according to some example embodiments.
Figure 8:
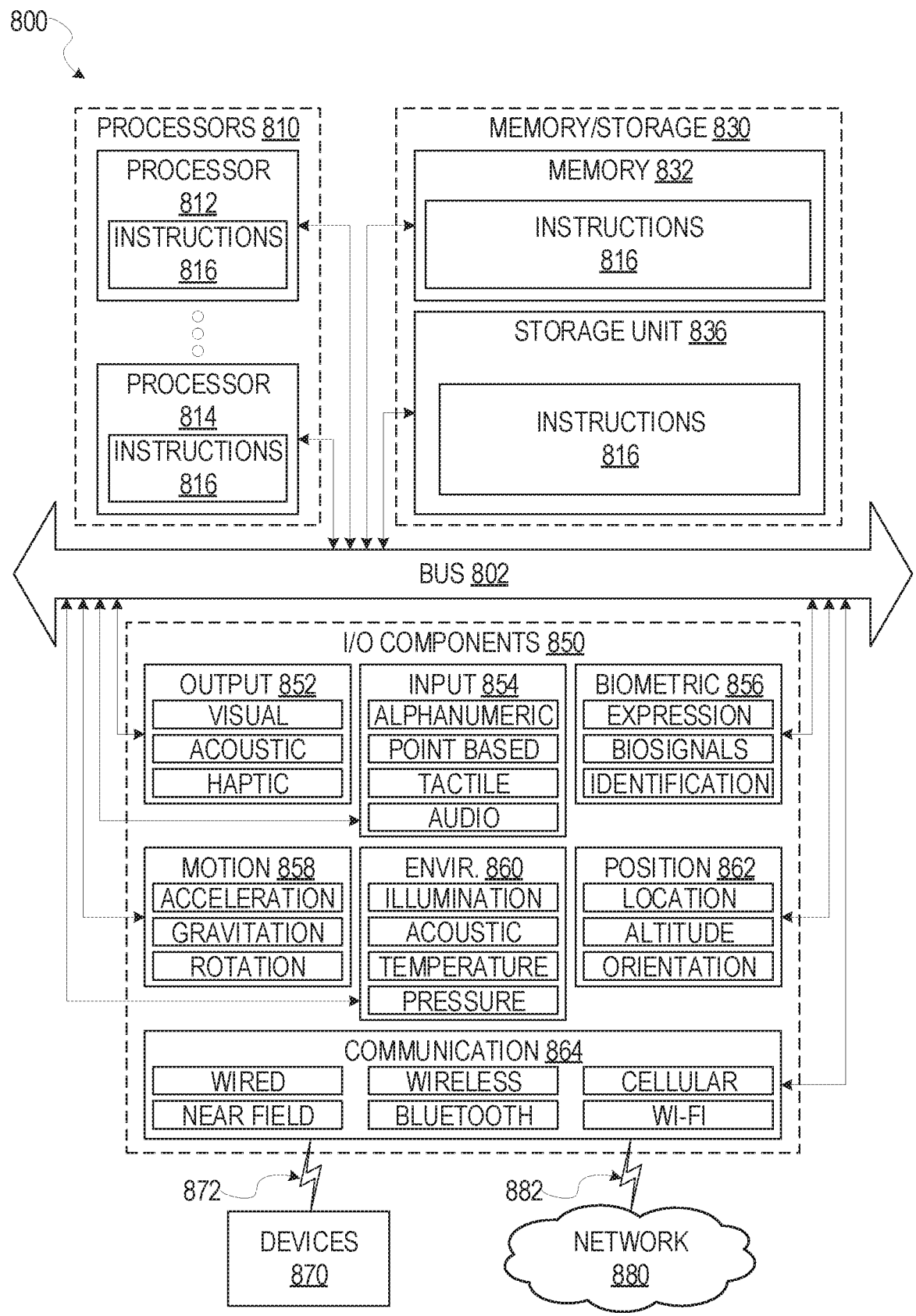
FIG. 8 illustrates a diagrammatic representation of a machine in the form of a computer system within which a set of instructions may be executed for causing the machine to perform any one or more of the methodologies discussed herein, according to an example embodiment.

The modules, methods, applications and so forth described in conjunction with FIGS. 7 and 8 are implemented in some embodiments in the context of a machine and associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

FIG. 7 is a block diagram 700 illustrating a representative software architecture 702, which may be used in conjunction with various hardware architectures herein described. FIG. 7 is merely a non-limiting example of a software architecture and it will be appreciated that many other architectures may be implemented to facilitate the functionality described herein. The software architecture 702 may be executing on hardware such as machine 800 of FIG. 8 that includes, among other things, processors 810, memory 830, and I/O components 850. A representative hardware layer 704 is illustrated and can represent, for example, the machine 800 of FIG. 8. The representative hardware layer 704 comprises one or more processing units 706 having associated executable instructions 708. Executable instructions 708 represent the executable instructions of the software architecture 702, including implementation of the methods, modules and so forth of FIGS. 1-6. Hardware layer 704 also includes memory and/or storage modules 710, which also have executable instructions 708. Hardware layer 704 may also comprise other hardware as indicated by 712 which represents any other hardware of the hardware layer 704, such as the other hardware illustrated as part of machine 800.

In the example architecture of FIG. 7, the software 702 may be conceptualized as a stack of layers where each layer provides particular functionality. For example, the software 702 may include layers such as an operating system 714, libraries 716, frameworks/middleware 718, applications 720 and presentation layer 760. Operationally, the applications 720 and/or other components within the layers may invoke application programming interface (API) calls 724 through the software stack and receive a response, returned values, and so forth illustrated as messages 726 in response to the API calls 724. The layers illustrated are representative in nature, and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 and/or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 include built-in applications 740, third party applications 742, and item ordering modules 744 (e.g., access module 302, identifying module 304, analysis module 306, ordering module 308, or presentation module 310). Examples of representative built-in applications 740 may include, but are not limited to, a contacts application, a browser application, a book reader application, a location application, a media application, a messaging application, and/or a game application. Third party applications 742 may include any of the built in applications as well as a broad assortment of other applications. In a specific example, the third party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 742 may invoke the API calls 724 provided by the mobile operating system such as operating system 714 to facilitate functionality described herein.

The applications 720 may utilize built in operating system functions (e.g., kernel 728, services 730 and/or drivers 732), libraries (e.g., system 734, APIs 736, and other libraries 738), frameworks/middleware 718 to create user interfaces to interact with users of the system. Alternatively, or additionally, in some systems interactions with a user may occur through a presentation layer, such as presentation layer 760. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware machine (such as the machine of FIG. 8, for example). A virtual machine is hosted by a host operating system (operating system 714 in FIG. 8) and typically, although not always, has a virtual machine monitor 746, which manages the operation of the virtual machine as well as the interface with the host operating system (i.e., operating system 714). A software architecture executes within the virtual machine such as an operating system 750, libraries 752, frameworks/middleware 754, applications 756 and/or presentation layer 760. These layers of software architecture executing within the virtual machine 748 can be the same as corresponding layers previously described or may be different.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example the instructions may cause the machine to execute the flow diagrams of FIGS. 4-6. Additionally, or alternatively, the instructions may implement the access module 302, the identifying module 304, the analysis module 306, the ordering module 308, and the presentation module 310. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 812 and processor 814 that may execute instructions 816. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core process), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of processors 810 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872 respectively. For example, the communication components 864 may include a network interface component or other suitable device to interface with the network 880. In further examples, communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as, location via Internet Protocol (IP) geo-location, location via Wi-Fi® signal triangulation, location via detecting an NFC beacon signal that may indicate a particular location, and so forth.

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to devices 870. The term "transmission medium" shall be taken to include any intangible medium that is capable of storing, encoding, or carrying instructions 816 for execution by the machine 800, and includes digital or analog communications signals or other intangible medium to facilitate communication of such software.

Executable Instructions and Machine-Storage Medium

The various memories (i.e., 830, 832, and/or memory of the processor(s) 810) and/or storage unit 836 may store one or more sets of instructions and data structures (e.g., software) 816 embodying or utilized by any one or more of the methodologies or functions described herein. These instructions, when executed by processor(s) 810 cause various operations to implement the disclosed embodiments.

As used herein, the terms "machine-storage medium," "device-storage medium," "computer-storage medium" (referred to collectively as "machine-storage medium") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal"

means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A method comprising:

accessing image input associated with a consumable item, the image input being recorded by a camera associated with a client device, the image input comprising at least one of a video or a photograph;

identifying an account associated with a user of the client device based on an identifier of the client device;

retrieving, from a database and using one or more hardware processors, purchase history data of previous purchases of the consumable item for the account;

determining, using the one or more hardware processors, a level of consumption of the consumable item for the account based on an analysis of the image input using one or more image recognition techniques and based on a prediction of a frequency of ordering of the consumable item, the prediction based at least in part on a pattern analysis of the purchase history data using at least one machine learning algorithm;

based on the level of consumption of the consumable item, determining a suggested schedule of future automatic orders of the consumable item;

displaying, at a user interface of the client device, the suggested schedule of future automatic orders of the consumable item;

receiving a selection of the suggested schedule of future automatic orders of the consumable item, the consumable item being automatically ordered on behalf of the user based on the suggested schedule;

displaying, at the user interface of the client device and based on the consumable item being automatically ordered, a prompt for providing feedback indicating a review of the consumable item; and receiving, via the user interface of the client device, the feedback indicating the review of the consumable item.

2. The method of claim 1, further comprising:

determining, for the account, a pattern of use of the consumable item over a period of time based on detecting a change associated with the consumable item in a plurality of image inputs associated with a plurality of timestamps, the plurality of timestamps being associated with the plurality of image inputs at a plurality of times of generating the plurality of image inputs; and predicting, for the account, the frequency of ordering of the consumable item based on the determined pattern of use of the consumable item, wherein the suggested schedule of future automatic orders of the consumable item is based on the frequency of ordering of the consumable item.

3. The method of claim 1, wherein the purchase history data is different than the image input.

4. The method of claim 1, wherein the purchase history data indicates that one or more of the previous purchases occurred over a period of time, and wherein determining the level of consumption is based on comparing a current level of consumption to a previous level of consumption.

5. The method of claim 1, wherein the determining of the level of consumption of the consumable item for the account based on the analysis of the image input comprises:

identifying a first image input associated with a first timestamp;

identifying a second image input associated with a second timestamp that is subsequent to the first timestamp; and determining, based on comparing the first image input and the second image input, a change in the second image input that indicates a decrease in the consumable item.

6. The method of claim 1, wherein the consumable item being automatically ordered on behalf of the user is further based on determining that the level of consumption of the consumable item is equal to or exceeds a threshold value.

7. The method of claim 1, wherein the consumable item being automatically ordered on behalf of the user is further based on determining that the consumable item is absent from a location determined to be a usual location of the consumable item.

8. A system comprising:
one or more hardware processors; and
a machine-readable medium for storing instructions that, when executed by the one or more hardware processors, cause the one or more hardware processors to perform operations comprising:
accessing image input associated with a consumable item, the image input being recorded by a camera associated with a client device, the image input comprising at least one of a video or a photograph;
identifying an account associated with a user of the client device based on an identifier of the client device;
retrieving, from a database, purchase history data of previous purchases of the consumable item for the account;
determining a level of consumption of the consumable item for the account based on an analysis of the image input using one or more image recognition techniques and based on a prediction of a frequency of ordering of the consumable item, the prediction based at least in part on a pattern analysis of the purchase history data using at least one machine learning algorithm;
based on the level of consumption of the consumable item, determining a suggested schedule of future automatic orders of the consumable item;
displaying, at a user interface of the client device, the suggested schedule of future automatic orders of the consumable item;
receiving a selection of the suggested schedule of future automatic orders of the consumable item, the consumable item being automatically ordered on behalf of the user based on the suggested schedule;
displaying, at the user interface of the client device and based on the consumable item being automatically ordered, a prompt for providing feedback indicating a review of the consumable item; and
receiving, via the user interface of the client device, the feedback indicating the review of the consumable item.

9. The system of claim 8, wherein the operations further include:
determining, for the account, a pattern of use of the consumable item over a period of time based on detecting a change associated with the consumable item in a plurality of image inputs associated with a plurality of timestamps, the plurality of timestamps being associated with the plurality of image inputs at a plurality of times of generating the plurality of image inputs; and
predicting, for the account, the frequency of ordering of the consumable item based on the determined pattern of use of the consumable item, wherein the suggested schedule of future automatic orders of the consumable item is based on frequency of ordering of the consumable item.

10. The system of claim 8, wherein the purchase history data is different than the image input.

11. The system of claim 8, wherein the purchase history data indicates that one or more of the previous purchases occurred over a period of time, and wherein determining the level of consumption is based on comparing a current level of consumption to a previous level of consumption.

12. The system of claim 8, wherein the determining of the level of consumption of the consumable item for the account based on the image input comprises:
identifying a first image input associated with a first timestamp;
identifying a second image input associated with a second timestamp that is subsequent to the first timestamp; and
determining, based on comparing the first image input and the second image input, a change in the second image input that indicates a decrease in the consumable item.

13. The system of claim 8, wherein the consumable item being automatically ordered on behalf of the user is further based on determining that the level of consumption of the consumable item is equal to or exceeds a threshold value.

14. The system of claim 8, wherein the consumable item being automatically ordered on behalf of the user is further based on determining that the consumable item is absent from a location determined to be a usual location of the consumable item.

15. A non-transitory machine-readable medium comprising instructions that, when executed by one or more hardware processors, cause the one or more hardware processors to perform operations comprising:
accessing image input associated with a consumable item, the image input being recorded by a camera associated with a client device, the image input comprising at least one of a video or a photograph;
identifying an account associated with a user of the client device based on an identifier of the client device;
retrieving, from a database, purchase history data of previous purchases of the consumable item for the account;
determining a level of consumption of the consumable item for the account based on an analysis of the image input using one or more image recognition techniques and based on a prediction of a frequency of ordering of the consumable item, the prediction based at least in part on a pattern analysis of the purchase history data using at least one machine learning algorithm;
based on the level of consumption of the consumable item, determining a suggested schedule of future automatic orders of the consumable item;
displaying, at a user interface of the client device, the suggested schedule of future automatic orders of the consumable item;
receiving a selection of the suggested schedule of future automatic orders of the consumable item, the consumable item being automatically ordered on behalf of the user based on the suggested schedule;
displaying, at the user interface of the client device and based on the consumable item being automatically ordered, a prompt for providing feedback indicating a review of the consumable item; and
receiving, via the user interface of the client device, the feedback indicating the review of the consumable item.

16. The non-transitory machine-readable medium of claim 15, wherein the operations further comprise:
determining, for the account, a pattern of use of the consumable item over a period of time based on detecting a change associated with the consumable item in a plurality of image inputs associated with a plurality of timestamps, the plurality of timestamps being associated with the plurality of image inputs at a plurality of times of generating the plurality of image inputs; and predicting, for the account, the frequency of ordering of the consumable item based on the determined pattern of use of the consumable item, wherein the suggested schedule of future automatic orders of the consumable item is based on the frequency of ordering of the consumable item.

17. The non-transitory machine-readable medium of claim 15, wherein the determining of the level of consumption of the consumable item for the account based on the analysis of the image input comprises:

identifying a first image input associated with a first timestamp;

identifying a second image input associated with a second timestamp that is subsequent to the first timestamp; and determining, based on comparing the first image input and the second image input, a change in the second image input that indicates a decrease in the consumable item.

18. The method of claim 1, wherein receiving the feedback indicating the review of the consumable item comprises:

receiving an indication of a hand gesture corresponding to the review.

\* \* \* \* \*